Aug. 23, 1932.   J. L. DRAKE   1,872,699
SHEET GLASS APPARATUS
Filed Dec. 26, 1928
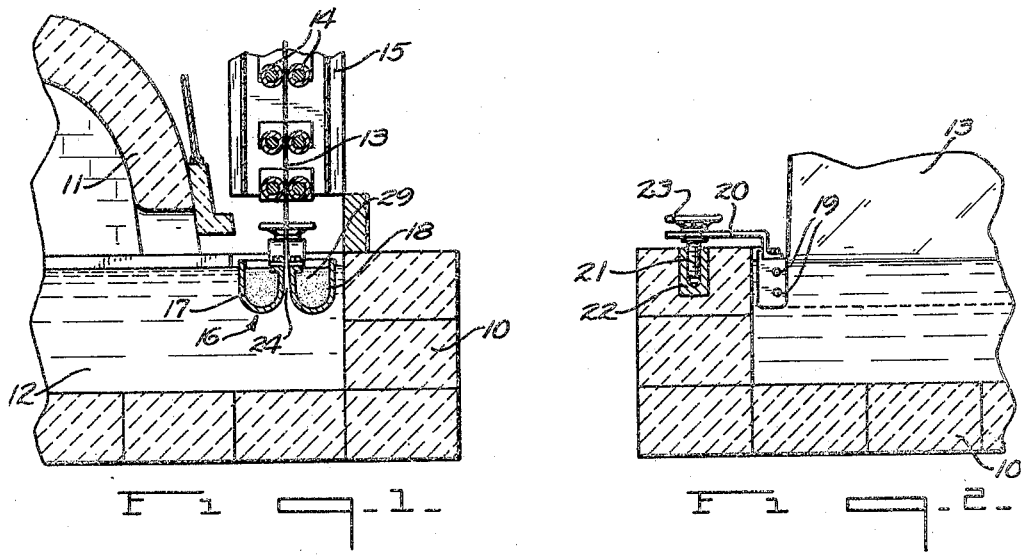
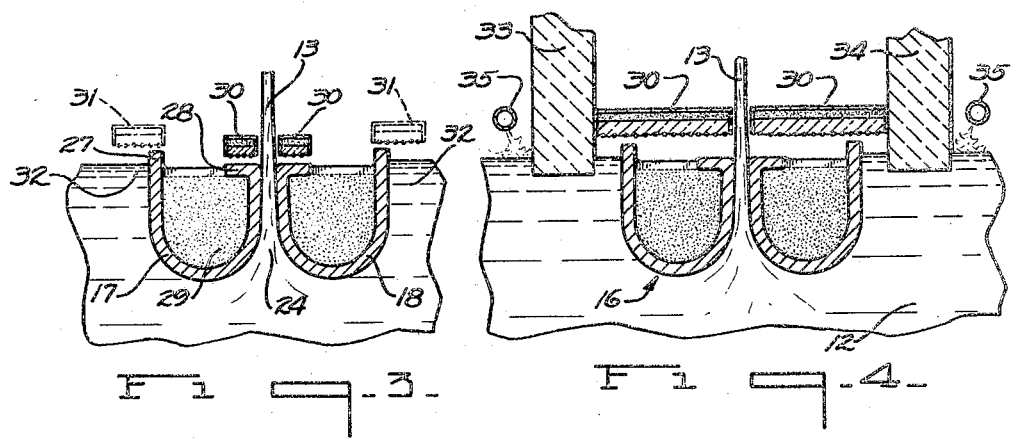
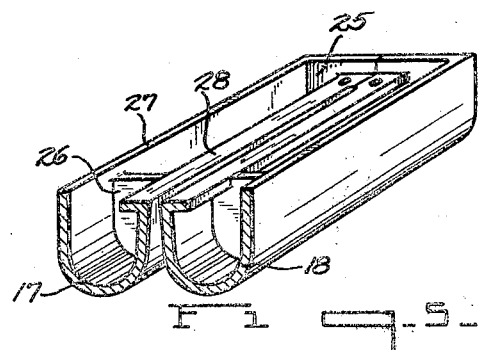
Inventor
John L. Drake
By Frank Fraser
Attorney Patented Aug. 23, 1932

1,872,699

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

SHEET GLASS APPARATUS

Application filed December 26, 1928. Serial No. 328,444.

The present invention relates broadly to the manufacture of sheet glass, and more particularly to improvements in apparatus for drawing sheet glass according to what is known as the "Fourcault" process.

In the drawing of sheet glass in accordance with such process, a slotted member ordinarily termed a "deputer" or "debiteuse" is immerged within a mass of molten glass in a manner that the glass will be forced upwardly into the slot thereof by the head pressure of the molten mass. The glass forced upwardly into the said slot creates a sheet source from which the sheet is drawn, said sheet being drawn vertically and annealed while traveling vertically.

An important object of this invention resides in the provision of a deputer of improved construction which will permit a sheet of glass to be drawn through the slot thereof without in any way destroying the outer surfaces of the glass.

Another object of the invention is to avoid erosion of the deputer whereby to maintain the surfaces thereof in contact with the molten glass smooth and thereby prevent the formation of lines in the sheet which might otherwise occur.

Another object of the invention is the provision of a deputer of novel design having associated therewith means whereby the said deputer can be maintained more nearly at a desired uniform temperature than heretofore, and whereby loss of heat therefrom by radiation may be minimized.

Another object of the invention is to provide a deputer so constructed that the walls of the slot through which the sheet is drawn may be maintained at a more nearly uniform temperature throughout the length thereof than heretofore whereby to facilitate and improve the drawing operation and the quality of sheet produced.

A further object of the invention involves the provision of a deputer having heating means associated therewith in such a manner as to apply heat to the molten glass immediately surrounding said deputer to the end that this glass will not become devitrified as quickly as heretofore, thus making possible the use of the deputer for a relatively longer period of time without necessitating any interruption of the drawing operation to clean out the devitrified glass.

Still another object of the invention involves the provision of means for applying heat to the deputer and molten glass adjacent thereto in a manner to greatly minimize or entirely prevent the passage thereof into the drawing and/or annealing chamber.

Other objects and advantages of the invention will become more apparent during the course of the following description when taken in connection with the accompanying drawing.

In the drawing forming a part of this application and wherein like numerals are employed to designate like parts throughout the same, Fig. 1 is a vertical longitudinal section through apparatus provided by the present invention with the heating means removed for the sake of clearness, Fig. 2 is a transverse section therethrough showing the mounting for the deputer, Fig. 3 is an enlarged vertical longitudinal section of the deputer in position, Fig. 4 is a somewhat similar view showing a slightly modified arrangement, and Fig. 5 is a perspective sectional view of the improved deputer.

In the apparatus shown, a drawing receptacle or compartment 10 is located at one side of the furnace 11 and is adapted to receive the molten glass 12 therefrom. The glass sheet 13 is drawn upwardly from the molten bath 12 by and between a plurality of pairs of rolls 14 and passed vertically through an annealing leer 15. While the present invention is illustrated in association with this particular type of drawing apparatus, it is not to be restricted to use in such connection. For instance, it may also be incorporated in the Colburn system for producing sheet glass wherein the sheet is initially drawn for a suitable distance in a generally vertical direction and then deflected into the horizontal plane and annealed while traveling horizontally.

To facilitate the drawing of the sheet, a slotted member or block ordinarily termed a "deputer" or "debiteuse" and designated in its entirety by the numeral 16, is adapted to be immerged within the mass of molten glass 12. In the past, the slotted members or deputers have ordinarily been constructed of a refractory material, but such a type of deputer has not, however, proven entirely satisfactory in all respects since the glass passing upwardly through the slot therein has tended to cause a disintegration of the walls thereof, and as a consequence the sheet drawn through the slot has had lines and other surface defects formed on its outer surfaces due to the contact of the glass with the relatively rough surfaces of the refractory member. The aim of this invention is to provide a deputer of improved construction by which the above objectionable feature may be eliminated so as to overcome, as far as possible, the formation of lines in the sheet. This is herein effected by constructing the deputer of metal. The metal used may be of any heat resisting and preferably non-corrosive alloy which will make it possible to immerge the deputer within the mass of molten glass from which the sheet is drawn without injuring the same. The sheet of glass drawn through a deputer formed from such a metal will be as nearly free from lines and other surface defects as possible since the metals do not have a tendency to cause surface defects in the sheet being drawn.

The deputer 16 is preferably composed of the two metallic parts 17 and 18 secured together by means of the transverse securing elements 19 (Fig. 2) to form a single unit so as to render the same more easily handled and placed in position. The deputer has secured to either end thereof an outwardly projecting arm 20 which rotatably carries a screw 21 threaded within a block or the like 22 embedded in the side wall of drawing receptacle 10. Upon rotation of the hand wheels 23 to rotate the screws 21, the deputer can be raised or lowered within the molten glass as desired.

The parts 17 and 18 of the deputer are, of course, spaced apart to provide a slot 24 therebetween through which the glass sheet 13 is adapted to be drawn. When the deputer is disposed within the molten glass 12 as illustrated, it will be apparent that the glass will be forced upwardly into the slot 24 by hydrostatic pressure to form a sheet source from which the glass sheet is drawn.

Each part 17 and 18 of the deputer comprises a substantially U-shaped housing or casing closed at either end by the end walls 25 and braced transversely by the transverse strengthening ribs or plates 26. The upper outer edge of each part 17 and 18 projects upwardly slightly beyond the level of the molten glass 12 as indicated at 27, while the upper inner edge of each part terminates at substantially the level of the molten glass and is directed inwardly to provide the lip 28. Arranged within the cavity formed in each part of the deputer is an insulating material 29 which may be powdered or the like, while arranged above the deputer in spaced relation thereto at each side of the sheet is an electric heating unit 30. These heating units are adapted to direct heat downwardly upon the deputer and may be relatively narrow as shown by the full lines in Fig. 3 to cover only the lips 28, or they may be large enough to cover the entire upper surface of the deputer as illustrated in Fig. 4. Likewise, separate heating units 31 may be positioned above the projecting portions 27 of the deputer as indicated by the broken lines in Fig. 3. Any suitable type of heating means may be employed.

By constructing the deputer in the manner above described, it will be apparent that when the same is immerged within the molten glass, the amount of surface exposed to the atmosphere will be minimized, and that means is provided for applying heat to those surfaces which must of necessity be exposed. The insulating material 29 is provided to prevent or greatly retard the loss of heat through radiation from those portions of the deputer submerged in the molten glass, while the electric heaters are adapted to apply heat to the exposed portions thereof. By providing the electric heating units 30, the lips 28 and upper edges of the slot 24 can be maintained at a more nearly uniform and constant temperature throughout the length thereof, which condition will greatly aid in the drawing of a sheet of good quality. Also, by providing a deputer of the character described and associating therewith the heaters 30, all portions of the deputer can be maintained at a more nearly constant and uniform temperature and at a temperature more nearly equal to the temperature of the molten glass so that as the sheet is drawn it will not come into direct contact with any cold surfaces or unevenly heated surfaces. The electric heaters can be so constructed that the amount of heat applied to different portions of the lips can be varied transversely of the sheet as may be desired. With such an arrangement as above described, erosion of the deputer will be avoided and the surface thereof kept smooth so as not to form lines in the sheet.

In addition to the lines and other surface defects formed on the sheet, the refractory deputers heretofore used cause the glass immediately adjacent the same to become devitrified and form what is known in the art as "dog-metal". This dog-metal has heretofore accumulated to such an extent that it has been necessary to shut down operation of the machine in order to remove the same. The present invention further contemplates the provision of means to prevent the glass around the deputer from becoming devitrified and this is herein effected by applying heat thereto. To this end, the electric heating elements 31 positioned above the projections 27 may extend therebeyond as illustrated so as to direct heat downwardly upon the surface of the areas of molten glass 32 which are at either side of the deputer. The electric heaters in Fig. 4 may likewise project outwardly beyond the deputer in the same manner if desired to apply heat to the molten glass between the jack-arches 33 and 34 and the deputer. Heating means 35 may be provided for heating the glass outside of the adjustable jack-arches. In this manner, the glass immediately adjacent the deputer will not become devitrified as quickly as heretofore, thus making it possible to use the deputer for a relatively longer period of time without necessitating a shut down of the machine to clean out the same. The formation of dog-metal will also be retarded by the provision of the metallic deputer and the insulating material therein whereby loss of heat from the deputer by radiation is prevented and the deputer in this way maintained more nearly the temperature of the molten glass. The electric heaters are adapted to apply heat to the deputer and molten glass adjacent thereto in such a manner as to minimize, if not entirely prevent, the passage of the heat upwardly into the drawing and/or annealing chamber. The passage of such heat upwardly may tend to disturb the desired temperature conditions set up within the said drawing and/or annealing chamber.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a sheet glass apparatus, the combination with a receptacle containing a mass of molten glass, and means for drawing a sheet vertically therefrom, of a member disposed within the molten glass and having a slot through which said sheet is drawn, and heating elements arranged above the member and projecting therebeyond at opposite sides thereof.

2. In sheet glass apparatus, the combination with a receptacle containing a mass of molten glass, and means for drawing a sheet vertically therefrom, of a member disposed within the molten glass and having a slot through which said sheet is drawn, insulating means arranged within said member, and heating means arranged above said member for directing heat downwardly thereupon and also upon the molten glass at opposite sides of said member.

3. In sheet glass apparatus, a metallic deputer having a cavity formed therein extending substantially the length thereof, and insulating material disposed within said cavity and substantially completely filling the same.

4. In sheet glass apparatus, a metallic slotted member adapted to be disposed within a mass of molten glass, and means disposed internally thereof and in contact with the walls of the slot for minimizing heat loss by radiation.

5. In sheet glass apparatus, a deputer adapted to be disposed within a mass of molten glass and having a cavity therein open at its upper end, insulating material disposed within the cavity, and heating elements above the deputer for directing heat downwardly thereupon, said heating elements projecting outwardly beyond the deputer at opposite sides thereof.

6. In a sheet glass apparatus, a deputer adapted to be disposed within a mass of molten glass, said deputer comprising spaced side portions providing a slot therebetween through whch a sheet is adapted to be drawn, each side portion having a cavity therein, and powdered insulating material disposed within each cavity.

7. In sheet glass apparatus, a deputer adapted to be disposed within a mass of molten glass, said deputer comprising spaced side portions providing a slot therebetween through which a sheet is adapted to be drawn, each side portion having a cavity therein, powdered insulating material disposed within each cavity, and heating elements positioned above the deputer for directing heat downwardly upon the portions thereof exposed to the atmosphere.

8. In sheet glass apparatus, a deputer adapted to be disposed within a mass of molten glass, said deputer comprising spaced side portions providing a slot therebetween through which a sheet is adapted to be drawn, and electric heating elements disposed above the deputer and extending substantially the entire length thereof for directing heat downwardly upon the upper edges of the slot to maintain such portions at a substantially uniform temperature throughout the entire length of said slot.

9. In sheet glass apparatus, a deputer adapted to be disposed within a mass of molten glass, said deputer comprising spaced side portions providing a slot therebetween through which a sheet is adapted to be drawn, each side portion having a cavity therein, powdered insulating material disposed within each cavity, and electric heating elements positioned above the deputer and extending substantially the entire length thereof for directing heat downwardly upon the upper edges of the slot to maintain such portions at a substantially uniform temperature throughout the entire length of said slot.

10. In sheet glass apparatus, a deputer adapted to be disposed within a mass of molten glass, said deputer comprising spaced side portions providing a slot therebetween through which a sheet is adapted to be drawn, each side portion being substantially U-shaped in cross section to provide a cavity therein, and insulating material disposed within said cavity.

11. In sheet glass apparatus, a deputer adapted to be disposed within a mass of molten glass, said deputer comprising spaced side portions providing a slot therebetween through which a sheet is adapted to be drawn, each side portion being substantially U-shaped in cross section to provide a cavity therein, insulating material disposed within said cavity, and heating elements positioned above the deputer and extending substantially the entire length thereof for directing heat downwardly upon the portions of the deputer exposed to the atmosphere, said heating elements also projecting outwardly beyond the deputer for directing heat downwardly upon the surface of the molten glass in proximity thereto.

12. In sheet glass apparatus, a metallic deputer adapted to be disposed within a mass of molten glass, said deputer comprising spaced side portions providing a slot therebetween through which a sheet is adapted to be drawn, each side portion having a cavity therein, and insulating means disposed within each cavity and substantially completely filling the same.

13. In sheet glass apparatus, a metallic deputer adapted to be disposed within a mass of molten glass, said deputer comprising spaced side portions providing a slot therebetween through which a sheet is adapted to be drawn, each side portion having a cavity therein, and insulating material disposed within each cavity and in contact with the walls of said slot.

Signed at Toledo, in the county of Lucas and State of Ohio, this 20th day of December, 1928.

JOHN L. DRAKE.